United States Patent
Bestenreiner et al.

[15] 3,644,019
[45] Feb. 22, 1972

[54] OPTICAL APPARATUS FOR THE REPRODUCTION OF SUPERIMPOSED PICTURES

[72] Inventors: Friedrich Bestenreiner, Grunwald near Munich; Reinhold Deml, Munich; Ulrich Greis, Miesbach; Josef Pfeifer, Unterhaching, all of Germany

[73] Assignee: AGFA-Gevaert Aktiengesellschaft, Leverkusen, Germany

[22] Filed: Oct. 6, 1969

[21] Appl. No.: 863,775

[30] Foreign Application Priority Data

Oct. 5, 1968 Germany.....................P 18 01 540.2

[52] U.S. Cl.........................350/162 SF, 350/171, 350/273, 353/37, 353/97
[51] Int. Cl....................................G02b 27/18, G02b 27/38
[58] Field of Search..............................350/162 SF

[56] References Cited

UNITED STATES PATENTS

| | | | |
|---|---|---|---|
| 3,314,052 | 4/1967 | Lohmann | 350/162 SF UX |
| 3,478,661 | 11/1969 | Heckscher | 350/162 SF UX |
| 3,546,374 | 12/1970 | Graser, Jr. | 350/162 SF X |

*Primary Examiner*—John K. Corbin
*Attorney*—Michael S. Striker

[57] ABSTRACT

Images of two or more groups of pictures exposed onto a photosensitive record carrier in the presence of gratings are projected onto a screen by focusing all of the pictures into a focal plane which accommodates several adjustable diaphragms or analogous image selecting devices each blocking all but one image of the corresponding group. Mirrors or analogous optical deflecting components are used to project the unblocked images from the focal plane onto separate sections of a screen so that two or more images can be viewed simultaneously.

13 Claims, 6 Drawing Figures

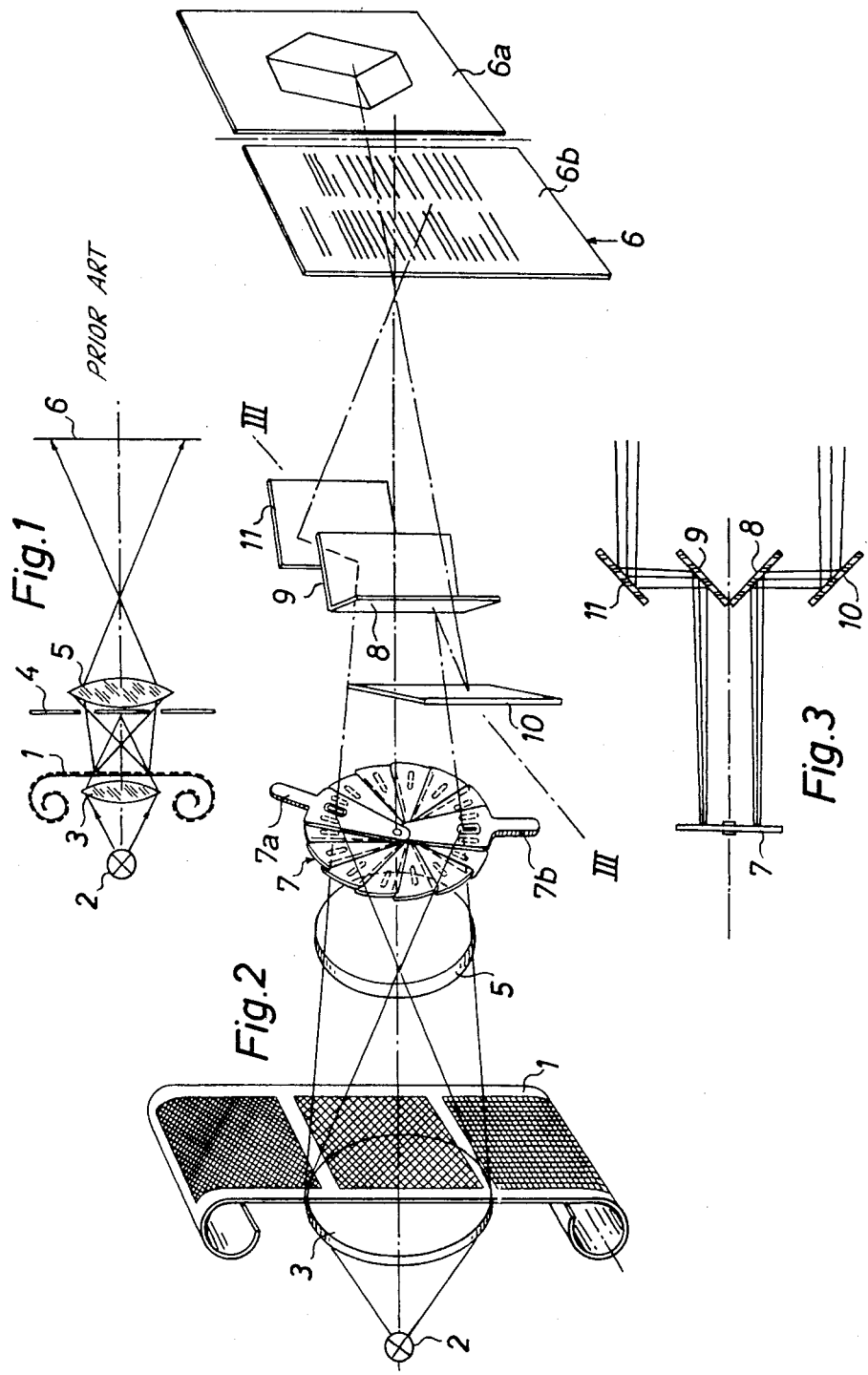

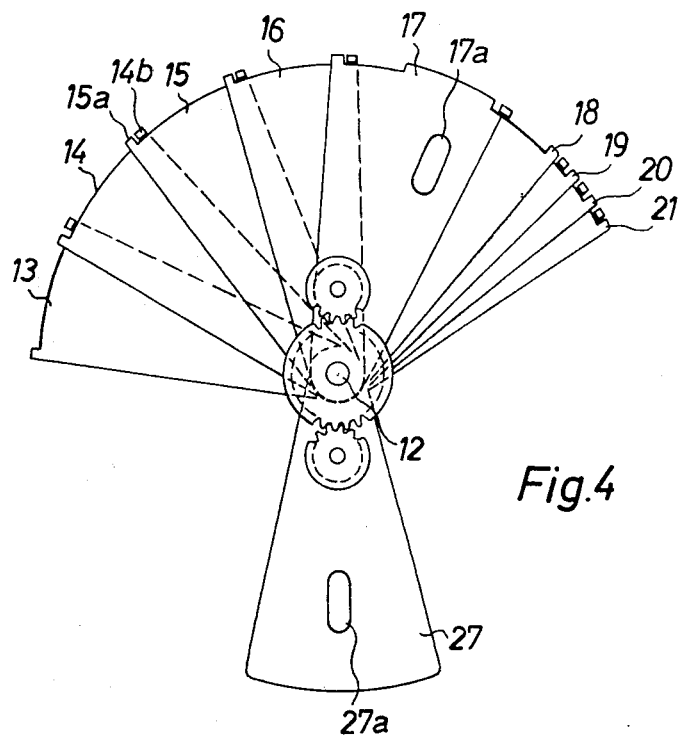
Fig.4
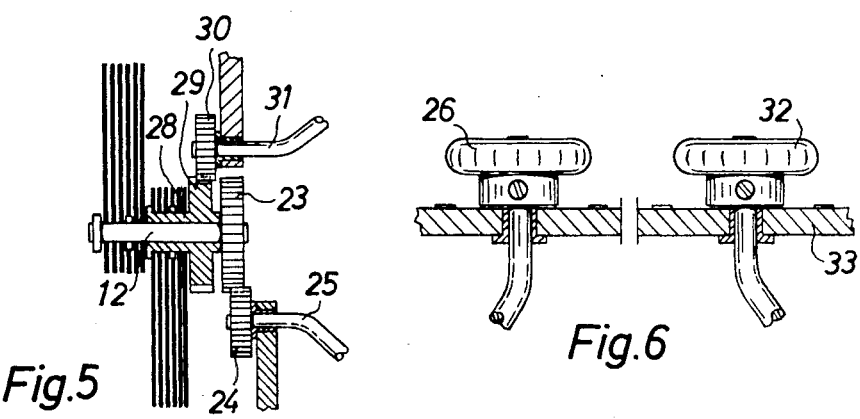
Fig.5
Fig.6
INVENTOR.
FRIEDRICH BESTENREINER
BY REINHOLD DEML
ULRICH GREIS
JOSEF PFEIFER

OPTICAL APPARATUS FOR THE REPRODUCTION OF SUPERIMPOSED PICTURES

CROSS-REFERENCE TO RELATED APPLICATION

The apparatus of the present invention constitutes an improvement over and a further development of reproducing apparatus disclosed in the copending application Ser. No. 803,676 filed on Mar. 3, 1969 by Friedrich Bestenreiner et al. and assigned to the same assignee.

BACKGROUND OF THE INVENTION

The present invention relates to apparatus for reproducing pictures, written or typed texts or analogous information (hereinafter called pictures) which is stored on film or another suitable record carrier. More particularly, the invention relates to improvements in projectors for viewing of information which is stored on record carriers in a manner as disclosed in the copending application Ser. No. 803,676 filed Mar. 3, 1969 by Bestenreiner et al. and assigned to the same assignee. Said copending application discloses a method and apparatus for superimposing two or more pictures or other information on a single record carrier by employing gratings having different grating constants and/or different azimuth angles and by resorting to higher diffraction orders. The reproducing apparatus or projector of the aforementioned copending application is designed to reproduce the image of one of several superimposed pictures at a time. It can happen, however, that the images of two or more of the pictures stored on a common record carrier should be observable at the same time. For example, if the information stored on a developed roll film includes the specifications and drawings of patents, it is convenient and hence desirable to project the image of the drawing simultaneously with the projection of image of the specification so that the descriptive part and/or the claims can be read with reference to the drawing. The apparatus of the aforesaid copending application is incapable of projecting the images of more than one of several superimposed pictures at a time.

SUMMARY OF THE INVENTION

An object of the present invention is to provide a novel and improved apparatus which is designed in such a way that it can simultaneously reproduce the images of two or more of several superimposed pictures on a common record carrier.

Another object of the invention is to provide a projector which can reproduce images of several superimposed pictures in such a way that the reproductions are observable at a desired distance from each other.

A further object of the invention is to provide a projector which is especially suited for simultaneous viewing of two or more discrete pages of text, illustrations, charts, maps or other information stored by repeated exposure of photographic film and by subsequent developing of the thus exposed film.

The invention is embodied in an apparatus for selective reproduction of images of several pictures which are exposed in superimposition upon each other on a light-transmitting record carrier in the presence of gratings having different constants or a grating placed into several angular positions. The apparatus comprises means for focusing into a predetermined focal plane all of the images superimposed upon a selected portion of a record carrier so that the resulting diffraction orders of images are separate from each other, selector means located in the focal plane and adjustable to mask or block selected diffraction orders of images and to render at least two of the images visible, and optical means preferably located in or close to the focal plane and serving to separately project the visible images so that the thus projected images are observable simultaneously, for example, on separate sections of a screen.

The optical means may include sets of mirrors, prisms or analogous components which can be fixedly mounted to insure that each selected visible image is projected in a preselected direction and can be seen on a preselected area of the screen.

The novel features which are considered as characteristic of the invention are set forth in particular in the appended claims. The improved reproducing apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic side elevational view of a prior reproducing apparatus;

FIG. 2 is a schematic perspective view of a reproducing apparatus which embodies one form of the invention;

FIG. 3 is a horizontal sectional view taken along the line III—III of FIG. 1;

FIG. 4 is a transverse vertical sectional view as seen in the direction of arrows from the line IV—IV of FIG. 2;

FIG. 5 is an enlarged sectional view as seen in the direction of arrows from the line V—V of FIG. 4; and FIG. 6 is a sectional view of a further detail in the apparatus of FIG. 2.

DESCRIPTION OF THE PREFERRED EMBODIMENTS

FIG. 1 illustrates schematically a reproducing apparatus which is identical with the apparatus shown in FIG. 4 of the copending application Ser. No. 803,676. The apparatus comprises a relatively small (preferably punctiform) light source 2 which emits light against a record carrier 1 (developed roll film) through a condenser lens 3. The plane in which the light source 2 is imaged by the condenser lens 3 is the so-called local frequency plane. The carrier 1 stores information (pictures) which was applied thereto by means of gratings having different constants or by placing a grating in different angular positions during successive exposures. The aforementioned local frequency plane accommodates diaphragm means 4 which only permits passage of such light which is needed to project one of several pictures onto a screen 6. As fully explained in the copending application Ser. No. 803,676, the light concentrations in the local frequency plane are separated from each other in accordance with the grating constant and/or the angular position of the grating. The apparatus further comprises an objective lens 5 located between the diaphragm means 4 and the screen 6 and serving to project the selected image onto the screen. A different picture will be seen on the screen 6 in response to a change in the position of the diaphragm means 4, i.e., the apparatus of FIG. 1 can project one picture at a time or several superimposed pictures at a time.

FIG. 2 illustrates a reproducing apparatus which embodies one form of the present invention. The record carrier 1 is a film on which several superimposed images were exposed in response to displacement of a grating (carrier frequency) through angles of equal magnitude. Therefore, the light concentrations corresponding to the exposures appear in the local frequency plane (focal plane) in the form of a circle and are angularly offset with reference to each other by angles corresponding to those between successive angular positions of the grating. The concentrations of the plus first order are confined to the upper half of the circle and the concentrations of the minus first order are confined to the lower half of the circle. The concentrations of each higher diffraction order are located on a separate circle of greater radius but at the same angular distance from each other.

One of the differences between the apparatus of FIGS. 1 and 2 is that the objective lens 5 is placed between a novel picture selecting device 7 and the record carrier 1. The light source 2 is imaged by the lenses 3 and 5 in the plane of the selecting device 7, and the objective lens 5 also projects the picture or pictures onto the screen 6. The selecting device 7 comprises several sector-shaped vanes or blades which are turnable about the optical axis in a manner to be fully described with reference to FIGS. 4 and 5. The vanes form two groups and the vanes of each of these groups are movable by one of two manually operated adjusting members 7a, 7b. There are seven light concentrations in each of the two semicircles.

The apparatus of FIG. 2 further comprises an optical picture deflecting unit whose components are located immediately or closely behind the selecting device 7. Such components include two mirrors 8 and 9. The mirror 8 reflects one of the selected pictures onto a further mirror 10 which reflects the picture onto the section 6a of a screen 6 located in a projection plane. The mirror 9 cooperates with a fourth mirror 11 to reflect a further picture onto the section 6b of the screen 6. As shown, the mirrors 8, 10 reflect pictures from the lower part of the local frequency plane (device 7) and the mirrors 9, 11 reflect pictures from the upper part of such plane. Since the arrangement is such that the light concentrations of the plus first order appear in one part and the light concentrations of the minus first order appear in the other part of the local frequency plane, the user is in a position to manipulate the adjusting members 7a, 7b and to thereby project one of several pictures onto each of the screen sections 6a, 6b. Since the plus first and minus first orders are totally equivalent, the brightness of simultaneously projected pairs of picture is the same, provided that the exposures were made under identical circumstances.

The exact positions of the mirrors 8–11 with reference to each other and with reference to the selecting device 7 are shown in FIG. 3. It is clear that these mirrors can be replaced by prisms or other suitable optical picture deflecting components. It is further clear that, by properly increasing the opening ratio of the objective and by properly selecting the grating constant, the apparatus of FIG. 2 can evaluate the second order of light concentrations; in such apparatus, the optical deflecting unit employs additional mirrors or analogous components to project more than two discrete pictures at a time, e.g., a total of four or six pictures each of which is observable on a different section of the screen. One pair of pictures can be projected for each order of light concentrations.

In many instances, the brightness of pictures in each order of light concentrations is different. This can be compensated for by employing light weakening means in the path of brighter pictures to insure that the brightness of pictures on the screen is at least substantially uniform. Alternatively, the light diffracting power of gratings which are used in exposing of pictures onto the record carrier 1 can be selected in such a way that the diffraction orders which are contemplated for evaluation exhibit a substantially uniform and preferably strongly pronounced brightness. This can be achieved, for example, by selecting a grating whose diffracting power or absorption curve during exposure is such that the selected orders appear with substantially equal amplitude. For example, a grating which is suitable for such purposes can be produced by exposure of film with superimposition of corresponding harmonic local frequencies. The just mentioned method of making gratings is fully disclosed in Ser. No. 803,676.

The details of one embodiment of a suitable picture selecting device for use in the apparatus of FIG. 2 are shown in FIGS. 4 to 6. The device 7 therein shown comprises a shaft 12 whose axis coincides with the optical axis and which supports two sets of vanes or blades including an upper group or set of vanes 13, 14, 15, 16, 17, 18, 19, 20 and 21. The lower group or set preferably comprises an equal number of vanes. The vane 17 is wider than the remaining vanes and is provided with an aperture in the form of a radially extending elongated slot 17a for one of the diffraction orders, for example, for the minus first order. The vane 17 can be turned back and forth about the axis of the shaft 12 between the two outermost orders whereby all of the superimposed images are projected onto the screen in a predetermined sequence and independently of each other. The means for coupling the vanes 13–21 for movement with each other but for permitting some movement of each vane with reference to the adjoining vane or vanes comprises cooperating motion transmitting projections or lugs, such as the lugs 14b and 15a shown in FIG. 4. Each vane partially overlaps an adjoining vane. As shown in FIG. 5, the vane 17 is attached to the shaft 12 and can be rotated by a gear 23 which is affixed to the shaft. The gear 23 meshes with a gear 24 which is rotatable by a flexible shaft 25 and an adjusting knob 26 mounted on a wall 33 of the apparatus. The number of teeth on the gear 24 is half the number of teeth on the gear 23. The wall 33 is preferably the front wall of the apparatus and is readily accessible to the operator's hand. The operator is thus in position to move the vane 17 between its two end positions and to select that picture which is to be projected through the slot 17a.

The lower part of FIG. 5 illustrates one of the second group or group of vanes, namely, a vane 27 having an aperture or slot 27a and corresponding to the vane 17 of the upper set. The vane 27 is affixed to a hollow shaft 28 which is turnable on the shaft 12 and can be rotated by means of mating gears 29, 30. The gear 30 can be rotated by an adjusting knob 32 on the wall 33 by way of a flexible shaft 31. The slot 27a of the vane 27 permits passage of the plus first order. The wall 33 is preferably provided with scales (not shown) which facilitate the selection of pictures.

It is clear that the mechanical connections (shafts 25, 31 etc.) between the knobs 26, 32 and the corresponding vanes 17, 27 can be replaced by electrical or other suitable connections. It is also possible to employ a set of electromagnetically operated shutters, one for each brightness and to place such shutters into the plane of the selecting device 7. A pushbutton switch is then provided to place a shutter in operative position in response to adjustment of the vane 17 or 27. The just mentioned modification is of particular advantage when the record carrier 1 is exposed by resorting to gratings having different constants.

It is also within the purview of our invention to combine the selecting device with the optical picture deflecting unit. For example, the mirror 9 of FIGS. 2 and 3 may be provided with movable strongly light-absorbent diaphragm vanes which prevent projection of more than one picture at a time. Thus, the picture deflecting unit can be rendered adjustable so that it can discriminate between several pictures.

The record carrier 1 used in the apparatus of FIG. 2 is preferably exposed to light in the presence of gratings having such diffracting and/or absorbing characteristics that the brightness of pictures in each diffraction order is at least nearly uniform, i.e., that all orders exhibit substantially identical intensities. Thus, a Fourrier analysis of the diffracting power or absorption of the grating should show that the evaluated orders appear with the same amplitude.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. Apparatus for selective reproduction of images of several pictures which are exposed in superimposition upon each other on a record carrier in the presence of diffraction gratings, comprising means for focusing into a predetermined focal plane all of the images which are superimposed on a selected portion of a record carrier so that the diffraction orders of said images are separate from each other; selector means located in said plane and adjustable to mask selected ones of said diffraction orders of said images; and optical means located behind said selector means and arranged to deflect the positive diffraction orders of each image in a first direction and to deflect the negative diffraction orders of each image in a second direction which is different from said first direction, said selector means having at least two openings which are adjustable so that the positive diffraction orders of a first image are deflected in said first direction and the negative diffraction orders of a second image are deflected in said second direction and that the thus projected images are observable simultaneously.

2. Apparatus as defined in claim 1, wherein said optical means comprises a plurality of mirrors arranged to project said visible images onto separate sections of a projection plane.

3. Apparatus as defined in claim 1, wherein said optical means comprises several groups of optical components, one for each of said visible images, for projecting the respective visible images into discrete sections of a second plane.

4. Apparatus as defined in claim 1, wherein said selector means comprises a plurality of electromagnetically controlled shutters whose characteristics are a function of the brightness of selected visible images, and means for moving said shutters in said focal plane to thereby select the corresponding visible images.

5. Apparatus as defined in claim 1, wherein said selector means comprises adjustable diaphragm means and adjusting means for said diaphragm means.

6. Apparatus as defined in claim 1, wherein said record carrier stores groups of pictures of several diffraction orders and wherein said selector means and said optical means comprise means for simultaneously selecting and projecting visible images of pictures of each of said orders.

7. Apparatus as defined in claim 6, further comprising means for determining the brightness of projected images.

8. Apparatus as defined in claim 7, wherein said last-mentioned means comprises diaphragm means.

9. Apparatus as defined in claim 7, wherein said last-mentioned means comprises filter means.

10. Apparatus as defined in claim 1, wherein said carrier stores several groups of pictures obtained by exposure to light in the presence of gratings having such diffracting or absorption characteristics that the brightness of all pictures in a group is substantially the same.

11. Apparatus for selective reproduction of images of several pictures which are exposed in superimposition upon each other on a record carrier in the presence of diffraction gratings, comprising means for focusing into a predetermined focal plane all of the images which are superimposed on a selected portion of a record carrier so that the diffraction orders of said images are separate from each other; selector means located in said plane and adjustable to mask selected ones of said diffraction orders of said images and to render at least two of said images visible, said selector means comprising adjustable diaphragm means and adjusting means for said diaphragm means, said diaphragm means comprising a plurality of groups of diaphragm vanes which are turnable about the optical axis of said focusing means and each of said groups comprising an apertured vane movable by said adjusting means between a plurality of positions in each of which the aperture of the respective apertured vane renders visible a different one of said superimposed pictures; and optical means for separately projecting said visible images so that the thus projected images are observable simultaneously.

12. Apparatus as defined in claim 11, wherein said diaphragm means further comprises coupling means connecting the vanes of each group for movement with and relative to each other.

13. Apparatus as defined in claim 11, wherein said adjusting means comprises rotary knobs and flexible shafts connecting said knobs with the respective groups of vanes.

* * * * *